Patented Sept. 30, 1941

2,257,545

UNITED STATES PATENT OFFICE 2,257,545

DETERGENT COMPOSITION

Francis J. Curtis, St. Louis, Mo., assignor to Monsanto Chemical Company, St. Louis, Mo., a corporation of Delaware No Drawing. Application December 24, 1937, Serial No. 181,599

4 Claims. (Cl. 252—129)

The present invention relates to a means of improving certain classes of products by adding thereto a solid modifying filler or bulking agent which results in a composition of superior characteristics.

The uses to which various solid substances are put renders it advisable that an appreciable proportion of another relatively inert solid be added thereto. Such solid bulking agents now used are generally in the nature of chemically inactive mineral fillers such as talc, diatomaceous earth, graphite, and bentonite. The fillers of this type are generally objectionable in that they greatly increase the weight of the composition, thereby increasing the cost of handling and shipping the same.

This invention involves the discovery that "aerogels" are admirably suited for the purpose of increasing the bulk of concentrated solids. The "aerogels" are defined by Patent Number 2,093,454 to Samuel S. Kistler as gels from which the continuous phase has been removed without substantially affecting the structure of the solid phase, whereby there is produced an extremely porous solid of very low apparent density.

It is an object of this invention to provide a solid composition in which the active ingredient is of materially reduced concentration.

A further object is the provision of a bulking agent or filler for concentrated solids which may be readily incorporated into a concentrated solid.

An outstanding object hereof is the provision of a class of solid fillers from which may be chosen a material compatible with the solid to be diluted, which filler will not effect adversely the value of the solid for its intended use, will form a solid of lower apparent density when incorporated in a mixture with a concentrated solid and lastly increase the usefulness of the product.

Another important object is the provision of a bulking agent or filler of very low apparent specific gravity.

The chemical industries are hampered in the attempt to introduce new compounds of a high degree of purity or strength by the fact that the consumers of such products are generally poorly equipped to make accurate measurements of small quantities. An outstanding example of this is found in the history of saccharine as a substitute for sugar. Because the substitute possesses roughly 500 times the power of ordinary sugar as a sweetening agent, it is practically impossible for the ordinary consumer to adapt it to that use without previous great dilution. Solutions of saccharine are difficult to handle, and it has been a major problem to place saccharine on the market on a large scale.

A similar problem is presented by anhydrous trisodium phosphate as a detergent and water softening agent. Users of the hydrous salt are accustomed to employing a definite amount by volume to accomplish a given purpose and are disinclined to use the anhydrous in proper proportion. The hydrated crystals contain about 57% of water, and it is therefore apparent that a given amount of anhydrous salt will do the work of more than twice as much hydrous trisodium phosphate. Accurate measurements of the more concentrated salt are difficult for untrained persons whose use of this material is somewhat intermittent.

An example of this situation is encountered in the attempt to sell anhydrous trisodium phosphate to housewives for water softening and general cleaning. It will be readily understood that tremendous savings in freight and other handling costs may be realized from the substitution of the anhydrous for the hydrated salt. But consumers have learned to use the hydrous material in certain definite proportions and it has been found to be difficult to educate them to the proper use of the anhydrous. A popular distaste has been built up with respect to the anhydrous because it costs more than the compound previously used and is not found to be correspondingly more efficient. The apparent lack of increased efficiency is directly traceable to the fact that persons who have become accustomed to the hydrated compound unconsciously use the more concentrated anhydrous in the amounts to which they are accustomed, even after having been informed that smaller amounts are satisfactory. No appreciable advantage is noted as a result of the excess of salt and the reputation of the better product is adversely affected.

I have found that the above difficulties are overcome and additional valuable properties are imparted to the mixture when anhydrous trisodium phosphate is mixed with an "aerogel" in substantially equal quantities by volume.

Mixtures of anhydrous trisodium phosphate and silica "aerogel" tend to form sodium silicate by reaction between silica and the alkaline salt when immersed in water. This reaction product is known to be a valuable detergent and adds its effect to that of the unreacted phosphate. The state of subdivision and the enormous surface area presented by reason of the porosity of the gel, make the "aerogel" highly reactive and the sodium silicate is rapidly formed in water.

A composition containing equal volumes of anhydrous trisodium phosphate and silica "aerogel" was thoroughly mixed. This was approximately equivalent on the basis of active ingredient present to an equal volume of hydrous trisodium phosphate, although much lighter per unit volume. The mixture is however markedly superior to the hydrous salt in detersive value. It is probable that a reaction takes place between the silica and the basic salt to form a small proportion of water glass, which aids in cleansing.

A very advantageous feature of anhydrous trisodium phosphate containing an appreciable proportion of silica "aerogel" is that the salt is rendered more readily soluble. The pure salt tends to form gummy agglomerates when added to water, which agglomerates are found to dissolve quite slowly and with considerable difficulty. It has been found that the presence of silica "aerogel" inhibits this tendency to become gummy, whereby solutions are more readily prepared. The "aerogels" are generally good caking inhibitors, and it is contemplated that any composition having a tendency to cake may be bulked with a suitable "aerogel," thereby obtaining not only reduced concentration but also improved physical characteristics.

Saccharine may be mixed with an edible "aerogel" as one formed from gelatine, albumen, or an edible metallic oxide. Magnesia gel is satisfactory for this purpose.

Soap powders now on the market contain a large proportion of air in order to impart the lightness and bulk that is found desirable by users thereof. An apparent specific gravity of 0.3 is now believed to be most satisfactory for the general market. The present invention contemplates the use of "aerogel" in soap powders to achieve, at least in part, the desired lightness and bulk. In this way there may be incorporated into the soap an additional detergent, such as silica, which will decrease the apparent density of the product.

In this case as in its use with trisodium phosphate, silica "aerogel" reacts with the alkaline primary component of the mixture to form sodium silicate, thereby reducing the alkalinity and furnishing additional detersive effects. A further advantage arising from the use of "aerogels" as bulking agents for detergents is due to the emulsifying effect of substances of that class. The "aerogels" have been found to be excellent emulsifying and dispersing agents, and even in those cases where the primary detergent reacts with the "aerogel," it is found that the detergent value is increased by reason of the emulsifying and wetting properties of "aerogels."

Due to its properties as a caking inhibitor, the presence of "aerogel" will increase the flowability of the composition. Although the amount of "aerogel" required to cause free flow of a soap powder is very small as compared to the quantity normally used as a filler, the increased flowability will be found to attend the addition of the amount contemplated by this invention.

It will be seen that by employing the concept of my invention, a proportion of a secondary active ingredient of low apparent density may be used to increase the bulk of a primary treating agent. Oxides of iron, magnesium, and silicon may be introduced into a composition to increase the bulk thereof to a large extent, while the weight of such oxide added is kept to the amount required for the use to which the composition is to be put. Metallic oxides having therapeutic value may be used to increase the bulk of foods or medicinal compositions.

Aspirin may be modified with an "aerogel" to form a composition of double purpose that is more readily soluble than aspirin. Magnesia is a valuable antiacid, and the magnesium salt of acetyl salicylic acid is readily soluble. It is within the scope of this invention to mix two molecular proportions of aspirin with one mol of magnesia "aerogel" to form a valuable medicinal preparation. This therapeutic agent comprises 1 part of magnesia "aerogel" to 9 parts of aspirin by weight.

The present invention also contemplates the absorption of treating liquids and solutions by the porous gel to be used as a solid bulking agent and carrier. For instance, an insecticide or fungicide may be incorporated in the pores of a silica gel to be used in bulking a fertilizer.

For treating "brown spot" in lawn grass a silica "aerogel" containing a mixture of mercuric chloride and mercurous chloride within its pores is very effective. The treating material is leached from the gel and is effective over a relatively long period of time. Carbon tetrachloride may be absorbed in the pores of an "aerogel" to prepare a fire extinguishing compound of high efficiency which is easy to handle since it appears to be a dry powder. The invention also contemplates the manufacture of explosives such as dynamite by bulking a highly explosive composition with "aerogel."

The following examples illustrate my invention:

*Example 1.*—Silica "aerogel" having an apparent specific gravity of 0.1 and being of such particle size as to pass a 100 mesh screen is mixed with an equal volume of anhydrous trisodium phosphate of substantially the same fineness. The resulting product is an excellent cleanser and detergent substitute for trisodium phosphate of commerce.

*Example 2.*—Substitute anhydrous sodium carbonate (soda ash) for the trisodium phosphate in Example 1.

*Example 3.*—Silica "aerogel" of an apparent specific gravity of 0.1 to 0.3 is ground to pass an 80 mesh screen and mixed with an industrial washing powder composed of 65 parts by weight of soda ash, 10 parts by weight of borax and 25 parts by weight of ordinary soap.

*Example 4.*—A good grade of household soap powder or flake which may itself be filled with 15 to 20 per cent of common fillers and having a pH of 10.2 to 10.8 is mix ground with an equal volume of silica "aerogel" having a specific gravity of 0.1 to 0.2.

*Example 5.*—A magnesium oxide or hydroxide "aerogel" having an apparent specific gravity of 0.15 to 0.25 is mixed with an equal volume of aspirin which has previously been granulated with 10 to 15% of starch. The resulting mixture is granulated and tabletted in the usual manner.

No claim is made herein to the "aerogels" per se or the method by which they are produced and it is to be understood that this invention is not so limited.

The quantity of "aerogel" employed according to my invention will depend upon the extent or degree of modification desired. In general, at least 10% by volume is preferred and the quantity may, depending upon the density of the "aerogel," represent as much as 60% or 70% of the total volume of the product. Thus, for example, in detergents, and in the case of silica "aerogel" where under the influence of water the detergent reacts with the silica "aerogel," I have found that a mixture containing 30%-60% by volume of "aerogel" gives excellent results. The "aerogel" for this purpose has an apparent gravity of less than 15% of the true specific gravity and preferably not greater than 0.3. As a result of the interaction, the "aerogel" functions not only to supply additional detergency in the form of sodium silicate but the property of "aerogels" to effect emulsification affords a material benefit. In addition, the alkalinity of the detergent is reduced without impairing the detergency of the soap product.

The "aerogels" may be made by the method described by Kistler, see for example, U. S. Patent 2,093,454 of September 21, 1937.

I claim:

1. A finely divided substantially dry detergent composition comprising a water-soluble alkaline reacting normally dry detergent and a solid diluent comprising an inorganic "aerogel," said "aerogel" exerting an anti-caking action and an emulsifying and dissolving action when said composition is added to water.

2. A finely divided detergent composition comprising substantially anhydrous trisodium phosphate and a solid diluent comprising a silica "aerogel," said "aerogel" exerting an anti-caking action and an emulsifying and dissolving action when said composition is added to water.

3. A finely divided detergent composition comprising substantially anhydrous sodium carbonate and a solid diluent comprising a silica "aerogel," said "aerogel" exerting an anti-caking action and an emulsifying and dissolving action when said composition is added to water.

4. A finely divided detergent composition comprising a finely divided substantially dry soap and a solid diluent comprising a silica "aerogel," said "aerogel" exerting an anti-caking action and an emulsifying and dissolving action when said composition is added to water.

FRANCIS J. CURTIS.